US011551481B2

(12) United States Patent
Luo et al.

(10) Patent No.: US 11,551,481 B2
(45) Date of Patent: Jan. 10, 2023

(54) LIVING BODY DETECTION METHOD AND APPARATUS, ELECTRONIC DEVICE, STORAGE MEDIUM, AND RELATED SYSTEM TO WHICH LIVING BODY DETECTION METHOD IS APPLIED

(71) Applicant: Tencent Technology (Shenzhen) Company Limited, Guangdong (CN)

(72) Inventors: Wenhan Luo, Guangdong (CN); Yaodong Wang, Guangdong (CN); Wei Liu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/073,035

(22) Filed: Oct. 16, 2020

(65) Prior Publication Data
US 2021/0042548 A1 Feb. 11, 2021

Related U.S. Application Data

(63) Continuation of application No. PCT/CN2019/111912, filed on Oct. 18, 2019.

(30) Foreign Application Priority Data

Oct. 25, 2018 (CN) .......................... 201811252616.2

(51) Int. Cl.
*G06T 7/292* (2017.01)
*G06V 40/40* (2022.01)
(Continued)

(52) U.S. Cl.
CPC .............. *G06V 40/45* (2022.01); *G06F 21/32* (2013.01); *G06Q 20/18* (2013.01);
(Continued)

(58) Field of Classification Search
None
See application file for complete search history.

(56) References Cited

U.S. PATENT DOCUMENTS 9,406,212 B2 * 8/2016 De Luca .............. G08B 21/245
9,953,233 B2 * 4/2018 Du ...................... G06V 40/1371
(Continued)

FOREIGN PATENT DOCUMENTS

CN  104794464 A  7/2015
CN  104794465 A  7/2015
(Continued)

OTHER PUBLICATIONS

International Search Report issued in International Application No. PCT /CN2019/111912 dated Jan. 22, 2020 (with English translation) (5 pgs.).
(Continued)

*Primary Examiner* — Shadan E Haghani
(74) *Attorney, Agent, or Firm* — ArentFox Schiff LLP

(57) ABSTRACT

Exemplary embodiments of this disclosure provide a living body detection method and apparatus, an electronic device, a storage medium, and a payment system, a video surveillance system, and an access system to which the living body detection method is applied, and generally belong to the field of biometric recognition technologies. The living body detection method can include obtaining an image of a to-be-detected object performing key point detection on a biometric feature corresponding to the to-be-detected object in the image, and constructing a constraint box in the image according to detected key points. Further, the method can include capturing a shape change of the constraint box constructed in the image, and determining the to-be-detected object as a prosthesis in response to capturing an abnormal deformation of the constraint box or detecting no key points.

18 Claims, 11 Drawing Sheets

(51) Int. Cl.
| | |
|---|---|
| *G07C 9/37* | (2020.01) |
| *G07C 9/10* | (2020.01) |
| *G06F 21/32* | (2013.01) |
| *G06Q 20/18* | (2012.01) |
| *G06Q 20/40* | (2012.01) |
| *H04N 7/18* | (2006.01) |
| *G06V 20/52* | (2022.01) |
| *G06V 40/20* | (2022.01) |
| *G06V 40/16* | (2022.01) |

(52) U.S. Cl.
CPC ....... *G06Q 20/40145* (2013.01); *G06T 7/292* (2017.01); *G06V 20/52* (2022.01); *G06V 40/171* (2022.01); *G06V 40/172* (2022.01); *G06V 40/20* (2022.01); *G07C 9/10* (2020.01); *G07C 9/37* (2020.01); *H04N 7/181* (2013.01); *G06T 2207/10016* (2013.01); *G06T 2207/30201* (2013.01); *G06T 2207/30232* (2013.01)

(56) References Cited

U.S. PATENT DOCUMENTS

| | | | |
|---|---|---|---|
| 10,592,728 B2* | 3/2020 | Ionita | G06V 10/56 |
| 2014/0337221 A1 | 11/2014 | Hoyos | |
| 2014/0337930 A1 | 11/2014 | Hoyos et al. | |
| 2016/0328621 A1 | 1/2016 | Negi et al. | |
| 2017/0295177 A1 | 10/2017 | Huang et al. | |
| 2018/0349682 A1* | 12/2018 | Wong | G06V 40/172 |

FOREIGN PATENT DOCUMENTS

| | | | | |
|---|---|---|---|---|
| CN | 105023010 A | | 11/2015 | |
| CN | 108427871 A | | 8/2018 | |
| CN | 109492551 A | | 3/2019 | |
| JP | 2001224430 A | * | 8/2001 | |
| KR | 20180000027 A | * | 1/2018 | |
| WO | WO2015/191913 A2 | | 12/2015 | |
| WO | WO-2016033184 A1 | * | 3/2016 | ............. G06F 21/32 |

OTHER PUBLICATIONS

Written Opinion of the International Searching Authority issued in International Application No. PCT/CN2019/111912 dated Jan. 22, 2020 (4 pgs.).

Extended European Search Report Issue in Application EP19876300 dated Oct. 29, 2021, (10 pages).

Chinese Office Action dated Jul. 4, 2022 in Application No. 201811252616.2, with Concise English Translation, pp. 1-22.

Fokkema, Jeroen. Using a challenge to improve face spoofing detection. MS thesis. University of Twente, 2016.

Silicon Valley Inspector, Wharton's only Chinese financial case: 300,000 loans in 3 minutes, https://www.sohu.com/a/1165288880_257855, Oct. 19, 2016, with English Translation, pp. 1-28.

Hongbin_xu, python dlib learning(11):link detection, https://blog.csdn.net/hongbin_xu/article/details/79033116, Jan. 11, 2018, with English Translation, pp. 1-14.

* cited by examiner

LIVING BODY DETECTION METHOD AND APPARATUS, ELECTRONIC DEVICE, STORAGE MEDIUM, AND RELATED SYSTEM TO WHICH LIVING BODY DETECTION METHOD IS APPLIED

RELATED APPLICATION

This application is a continuation of International Application No. PCT/CN2019/111912, filed on Oct. 18, 2019, which claims priority to Chinese Patent Application No. 201811252616.2, entitled "LIVING BODY DETECTION METHOD AND APPARATUS, AND RELATED SYSTEM TO WHICH LIVING BODY DETECTION METHOD IS APPLIED" and filed on Oct. 25, 2018. The entire disclosures of the prior applications are hereby incorporated by reference in their entirety.

FIELD OF THE TECHNOLOGY

Embodiments of this application relate to the field of biometric recognition technologies, including to a living body detection method and apparatus, an electronic device, a storage medium, and a payment system, a video surveillance system, and an access system to which the living body detection method is applied.

BACKGROUND OF THE DISCLOSURE

With the development of biometric recognition technologies, biometric recognition, such as facial recognition in face-swiping payment and video surveillance, and fingerprint recognition, and iris recognition in access authorization, is widely applied. However, various challenges also exist in the biometric recognition. For example, an attacker performs biometric recognition by using forged face, fingerprint, iris, and the like.

SUMMARY

Embodiments of this application provide a living body detection method and apparatus, an electronic device, a storage medium, and a payment system, a video surveillance system, and an access system to which the living body detection method is applied.

An exemplary embodiment of this application provides a living body detection method that can be performed by an electronic device. The method can include obtaining an image of a to-be-detected object, and performing key point detection on a biometric feature corresponding to the to-be-detected object in the image. The method can also include constructing a constraint box in the image according to detected key points, capturing a shape change of the constraint box constructed in the image, and determining the to-be-detected object as a prosthesis in response to capturing an abnormal deformation of the constraint box or detecting no key points.

An embodiment of this application provides a living body detection apparatus. The apparatus can include processing circuitry that is configured to perform operations including obtaining an image of a to-be-detected object, performing key point detection on a biometric feature corresponding to the to-be-detected object in the image, and constructing a constraint box in the image according to detected key points. The processing circuitry can further perform operations including capturing a shape change of the constraint box constructed in the image, and determining the to-be-detected object as a prosthesis in response to capturing an abnormal deformation of the constraint box or detecting no key points.

An embodiment of this application provides an electronic device, including a processor and a memory that stores non-transitory computer-readable instructions that, when executed by the processor, implements the living body detection method described above.

Another embodiment of this application provides a non-transitory computer-readable storage medium that stores a computer program that, when executed by a processor, causes the processor to implement operations of the living body detection method described above.

A further embodiment of this application provides a payment system including a payment terminal and a payment server. The payment terminal being configured to acquire an image of a payment user. The payment terminal can include a living body detection apparatus that is configured to construct a constraint box in the image of the payment user according to detected key points, capture an abnormal deformation of the constraint box in the image, and determine the payment user as a living body in response to not capturing the abnormal deformation of the constraint box. Additionally, the payment terminal can perform identity authentication on the payment user in a case that the payment user is a living body, to initiate a payment request to the payment server in a case that the payment user passes the identity authentication.

A further embodiment of this application provides a video surveillance system, the video surveillance system including a surveillance screen, several cameras, and a surveillance server. The several cameras can be configured to acquire an image of a monitored object. The surveillance server can include a living body detection apparatus, configured to construct a constraint box in the image of the monitored object according to detected key points, capture an abnormal deformation of the constraint box in the image, and determine the monitored object as a living body in response to not capturing the abnormal deformation of the constraint box. The surveillance server can perform identity recognition on the monitored object in a case that the monitored object is a living body, to obtain a tracked target, and performing video surveillance on the tracked target by using an image picture in the surveillance screen.

An embodiment of this application provides an access system, including a reception device, a recognition server, and an access control device, the reception device being configured to acquire an image of an access object. The recognition server includes a living body detection apparatus that is configured to construct a constraint box in the image of the access object according to detected key points, capture an abnormal deformation of the constraint box in the image, and determine the access object as a living body in response to not capturing the abnormal deformation of the constraint box. Further, the recognition server can perform identity recognition on the access object in a case that the access object is a living body, so that the access control device configures an access permission for the access object that completes the identity recognition successfully, and the access object controls, according to the configured access permission, an access barrier of a specified work region to perform a release action.

It is to be understood that the foregoing general descriptions and the following detailed descriptions are only exemplary and explanatory, and should not be construed in any way to limit the embodiments of this application.

BRIEF DESCRIPTION OF THE DRAWINGS

The accompanying drawings herein are incorporated in and constitute a part of the specification, illustrate embodi

FIG. 3 is a schematic diagram of key points of a facial feature in an image involved in the embodiment corresponding to FIG. 2.

FIG. 4 is a schematic diagram of a constraint box constructed in an image by key points corresponding to a facial feature involved in the embodiment corresponding to FIG. 2.

DESCRIPTION OF EMBODIMENTS

Exemplary embodiments are described in detail herein, and examples thereof are shown in the accompanying drawings. When the following descriptions are made with reference to the accompanying drawings, unless indicated otherwise, same numbers in different accompanying drawings represent the same or similar elements. The implementations described in the following exemplary embodiments do not represent all implementations that are consistent with the embodiments of this application. On the contrary, the implementations are merely examples of apparatuses and methods that are described in detail in the appended claims and that are consistent with some aspects of the embodiments of this application.

A living body detection method is living body detection performed for an image of a to-be-detected object, that is, detecting whether a biometric feature contour of the to-be-detected object in the image changes. If it is detected that the biometric feature contour of the to-be-detected object in the image changes, the to-be-detected object is determined as a living body. For example, if the biometric feature of the to-be-detected object in the image is an eye or a mouth, when the to-be-detected object blinks or opens mouth, the biometric feature contour in the image changes, so that the to-be-detected object may be determined as a living body.

For a prosthesis attack behavior of an attacker, for example, a rotation bending attack or a multi-angle rotation attack, the attacker bends, twists, and rotates and offsets a stolen image of a to-be-detected object by using movement characteristics of an eye or a mouth, causing a biometric feature contour in the image to be twisted or an image to be laterally deflected, which leads to an illusion that the prosthesis blinks or opens mouth. As a result, the prosthesis is mistakenly determined as a living body.

The existing living body detection method still has the defect of a poor defense against a prosthesis attack behavior of an attacker. Therefore, the embodiments of this application provide a living body detection method, and the living body detection method can effectively improve the defense against a prosthesis attack, and has relatively high security.

The living body detection method can be implemented by a computer program, and accordingly, a constructed living body detection apparatus may be stored in an electronic device with the Von Neumann architecture, to be performed in the electronic device, to further implement living body detection of a to-be-detected object. For example, the electronic device may be a smartphone, a tablet computer, a notebook computer, a desktop computer, a server, or the like, which is not limited herein.

Figure 1:
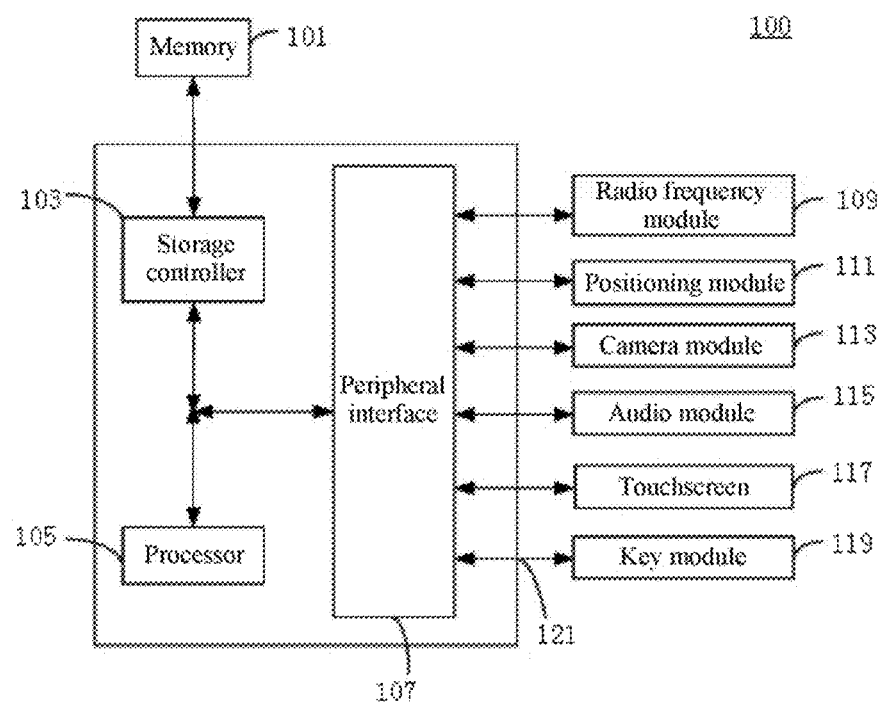
- FIG. 1 is a block diagram of a hardware structure of an electronic device according to an exemplary embodiment.

FIG. 1 is a block diagram of an electronic device according to an exemplary embodiment of this application. The electronic device is merely an example adapted to the embodiments of this application, and cannot be considered as providing any limitation to a use range of the embodiments of this application. The electronic device cannot be explained as needing to rely on or needing to have one or more components in the exemplary electronic device 100 shown in FIG. 1.

As shown in FIG. 1, the electronic device 100 can include a memory 101, a storage controller 103, one or more (only one is shown in FIG. 1) processors 105, a peripheral interface 107, a radio frequency module 109, a positioning module 111, a camera module 113, an audio module 115, a touchscreen 117, and a key module 119. These components communicate with each other by using one or more communication buses/signal lines 121. Of course, it should be understood that one or more of the modules described in this description can be implemented by processing circuitry, for example.

The memory 101 may be configured to store a computer program and a module, for example, a computer instruction and a module corresponding to the living body detection method and apparatus in the exemplary embodiments of this application, and the processor 105 performs various functions and data processing by executing the computer program stored in the memory 101, to implement the living body detection method described in any embodiment of this application. The memory 101 is used as a carrier for resource storage, and may be a random access memory such as a high-speed random access memory, a non-volatile memory, such as one or more magnetic storage devices, a flash memory, or another solid-state memory. The storage manner may be transient storage or permanent storage.

The peripheral interface 107 may include at least one wired or wireless network interface, at least one series-parallel conversion interface, at least one input and output interface, at least one USB interface, and the like, and is configured to couple various external input/output apparatuses to the memory 101 and the processor 105, to implement communication with the various external input/output apparatuses.

The radio frequency module 109 is configured to receive and send an electromagnetic wave, and implement mutual conversion between the electromagnetic wave and an electric signal, so as to communicate with another device by using a communication network. The communication network includes a cellular telephone network, a wireless local area network, or a metropolitan area network. The communication network may use various communication standards, protocols and technologies.

The positioning module 111 is configured to obtain a current geographical location of the electronic device 100. An example of the positioning module 111 includes, but is not limited to, the Global Positioning System (GPS) or a positioning technology based on a wireless local area network or a mobile communication network.

The camera module 113 belongs to cameras, and is configured to capture a picture or a video. The captured picture or video may be stored in the memory 101, or may be sent to a host computer by using the radio frequency module 109. For example, the camera module 113 is used to capture a to-be-detected object, to form an image of the to-be-detected object.

The audio module 115 provides an audio interface for a user, and may include one or more microphone interfaces, one or more speaker interfaces, and one or more earphone interfaces. Interaction of audio data is performed with another device by using the audio interface. Audio data may be stored in the memory 101, or may be sent by using the radio frequency module 109.

The touchscreen 117 provides an input and output interface between the electronic device 100 and the user. Specifically, the user may perform an input operation by using the touchscreen 117, such as a gesture operation like clicking, touching, or sliding, so that the electronic device 100 responds to the input operation. The electronic device 100 displays and outputs output content formed by any form of text, pictures, or videos or a combination thereof to the user by using the touchscreen 117.

The key module 119 includes at least one key, for providing an interface for the user to input information to the electronic device 100. The user may press different keys to enable the electronic device 100 to perform different functions. For example, a volume adjustment key may be used by the user to adjust the volume of sound played by the electronic device 100.

It may be understood that the structure shown in FIG. 1 is only for the purpose of illustration, and the electronic device 100 may alternatively include more or fewer components than those shown in FIG. 1, or have components different from those shown in FIG. 1. The components shown in FIG. 1 may be implemented by using hardware, software, or a combination thereof.

Figure 2:
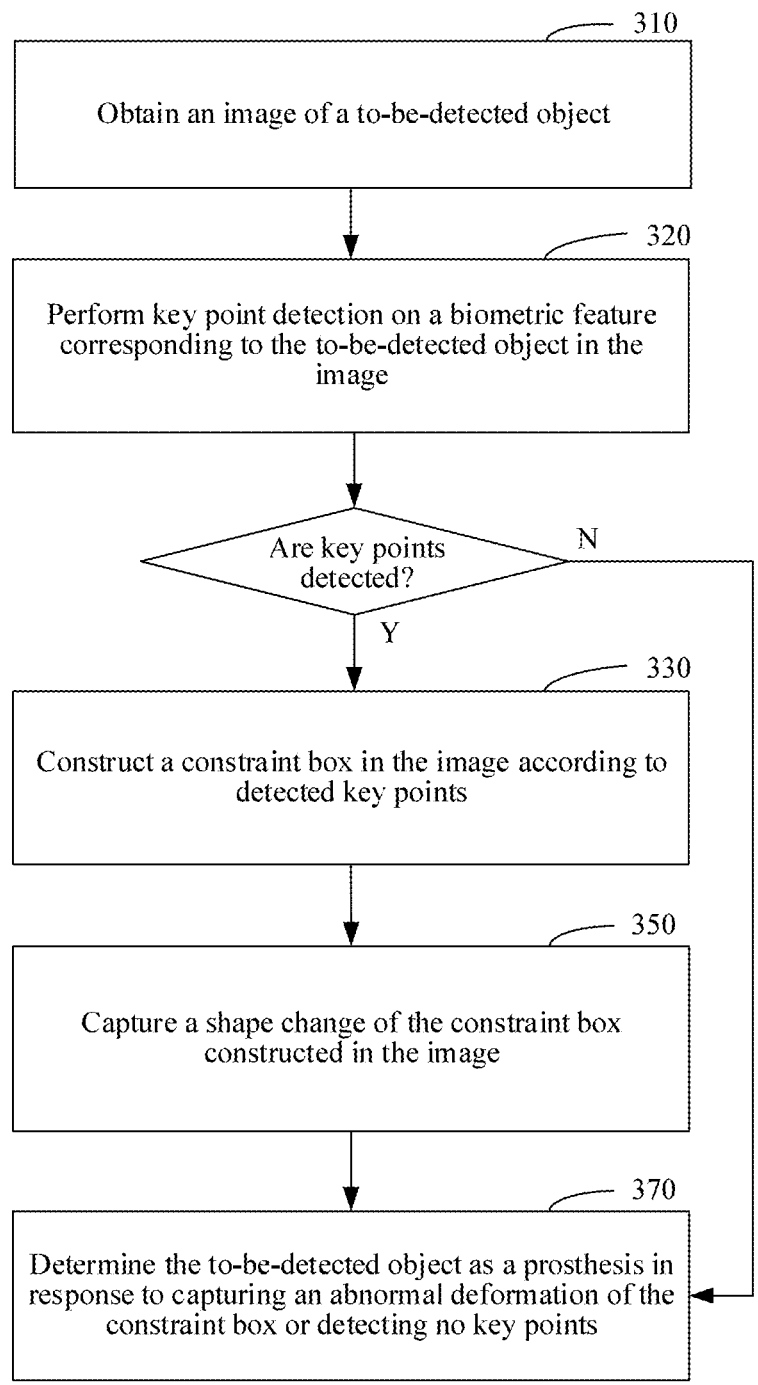
FIG. 2 is a flowchart of a living body detection method according to an exemplary embodiment.

Referring to FIG. 2, in an exemplary embodiment of this application, a living body detection method is applicable to an electronic device. A structure of the electronic device may be as shown in FIG. 1. The living body detection method may be performed by the electronic device, and may include the following steps.

In step 310, method can obtain an image of a to-be-detected object. First, the to-be-detected object may be a payment user of a to-be-paid order, an access object to be authorized to access a gate, or a to-be-tracked monitored object. The to-be-detected object is not specifically limited in this embodiment. Correspondingly, different to-be-detected objects may correspond to different application scenarios. For example, a payment user of a to-be-paid order corresponds to an identity authentication scenario, a to-be-tracked monitored object corresponds to an identity recognition scenario, and an access object to be authorized to access a gate corresponds to an identity recognition scenario.

It may be understood that, a prosthesis attack behavior of an attacker may exist in both the identity authentication and the identity recognition. For example, a monitored object may hide from tracking by using a dummy. Therefore, the living body detection method provided in this embodiment may be applicable to different application scenarios according to different to-be-detected objects.

Second, the image obtaining of the to-be-detected object may be an image acquired in real time, or may be an image pre-stored, that is, acquired by reading images in a historical time period in a buffer region. This is also not limited in this embodiment. In other words, after a camera device acquires an image of a to-be-detected object in real time, living body detection may be performed for the image of the to-be-detected object in real time. For example, living body detection is performed on an image obtained by shooting an access object, so that the access object can be authorized to access a gate in real time; or living body detection may be performed after an image of a to-be-detected object is pre-stored. For example, during tracking of a monitored object, living body detection is performed by reading historical surveillance images of the monitored object according to instructions of security personnel.

The camera device may be a video camera, a video recorder, or another electronic device having an image acquisition function, for example, a smartphone.

In step 320, the method can perform key point detection on a biometric feature corresponding to the to-be-detected object in the image. The biometric feature of the to-be-detected object, for example, may be a face, an eye, a mouth, a hand, a foot, a fingerprint, or an iris.

Figures 3, 4:
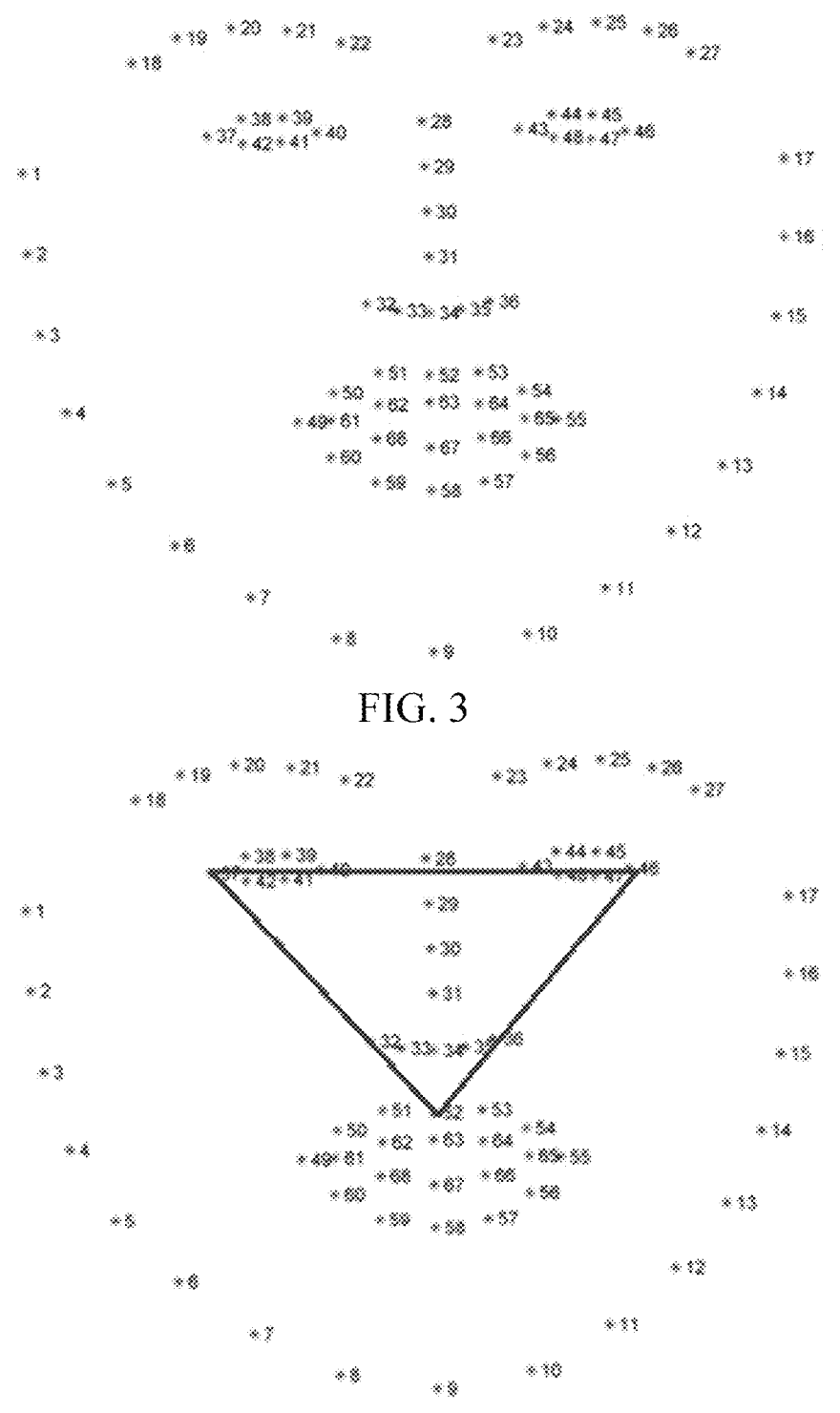

It may be understood that, the biometric feature of the to-be-detected object has a corresponding contour in the image, and the contour is formed by a series of pixels in the image. Therefore, key pixels in the series of pixels are regarded as key points of the biometric feature in the image. Description is made by using an example in which the biometric feature of the to-be-detected object is a facial feature. As shown in FIG. 3, the facial feature in the image has 68 key points, specifically including: six key points 37 to 42 and 43 to 48 of the left and right eyes in the image, 20 key points 49 to 68 of the mouth in the image, and the like In an embodiment of this application, the key points of the biometric feature in the image are uniquely represented by different coordinates (x, y). If the key points are detected, step 330 is performed to construct a constraint box. On the contrary, if no key points are detected, it indicates that there is a prosthesis attack, causing an excessively high image twist degree, and further causing the biometric feature corresponding to the to-be-detected object in the image to be completely destroyed. Consequently, the key point detection fails, the constraint box cannot be constructed, and step 370 is performed to determine the to-be-detected object as a prosthesis.

In step 330, the method can construct a constraint box in the image according to detected key points. After the key points of the biometric feature in the image are detected, several key points may be further selected from the key points, so as to construct the constraint box in the image. For example, from the 68 key points of the facial feature in the image shown in FIG. 3, the key point 46 corresponding to the left canthus of the eye, the key point 37 corresponding to the right canthus of the eye, and the key point 52 corresponding to the philtrum position of the mouth are selected. Therefore, the constraint box is constructed by the key point 46, the key point 37, and the key point 52, as the triangular box shown in FIG. 4.

Figure 5:
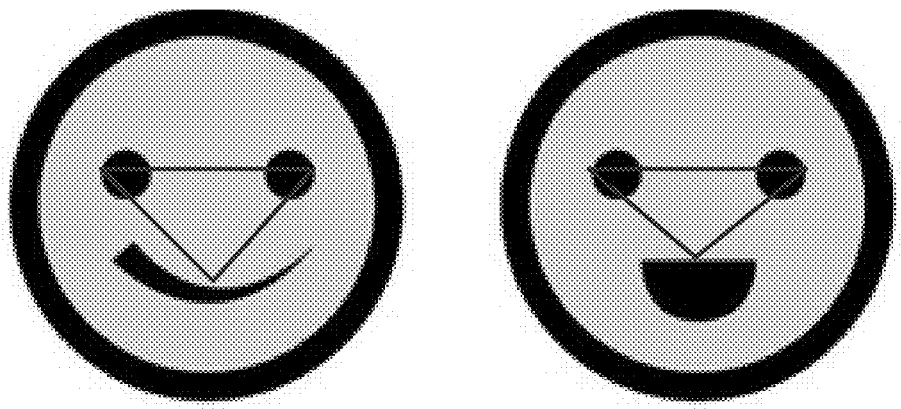
FIG. 5 is a schematic diagram of a shape change of a constraint box in a mouth open process of a to-be-detected object involved in the embodiment corresponding to FIG. 2.

In step 350, the method can capture a shape change of the constraint box constructed in the image. As described above, the prosthesis attack includes a rotation bending attack, a multi-angle rotation attack, and the like. It may be understood that, the rotation bending attack bends, twists, and rotates and offsets the image, and the multi-angle rotation attack may rotate and offset the image, which further causes a severe deformation of the constraint box in the image. Alternatively, it may be understood that, if there is no prosthesis attack behavior of an attacker, in a blinking or mouth open process of the to-be-detected object, the shape of the constraint box in the image essentially does not change obviously, as shown in FIG. 5. Therefore, in this embodiment, whether the to-be-detected object is a prosthesis may be determined based on whether the shape of the constraint box changes obviously.

In an embodiment of this application, the shape change of the constraint box includes, but is not limited to, the shape of the constraint box in the image changes obviously, and the position of the constraint box in the image changes obviously. For example, for the rotation bending attack, the shape of the constraint box in the image is twisted obviously, so that an abnormal deformation of the constraint box may be captured.

Alternatively, for the multi-angle rotation attack, the position of the constraint box in the image offsets obviously, so that an abnormal deformation of the constraint box may be captured.

If the abnormal deformation of the constraint box is captured, step 370 is performed to determine the to-be-detected object as a prosthesis. On the contrary, if there is no abnormal deformation of the constraint box, it may be regarded that there is no prosthesis attack behavior of an attacker, and whether the to-be-detected object is a living body is further detected.

In step 370, the method can determine the to-be-detected object as a prosthesis in response to capturing an abnormal deformation of the constraint box or detecting no key points. That is, no matter whether there is an abnormal deformation of the constraint box or the constraint box disappears due to the failure to detect key points, it is regarded that there is a prosthesis attack, and the to-be-detected object is determined as a prosthesis.

Through the foregoing process, a living body detection solution based on a constraint box is implemented, to effectively filter out the prosthesis attack behavior of the attacker, thereby improving the defense of the living body detection against the prosthesis attack, and providing higher security.

Figure 6:
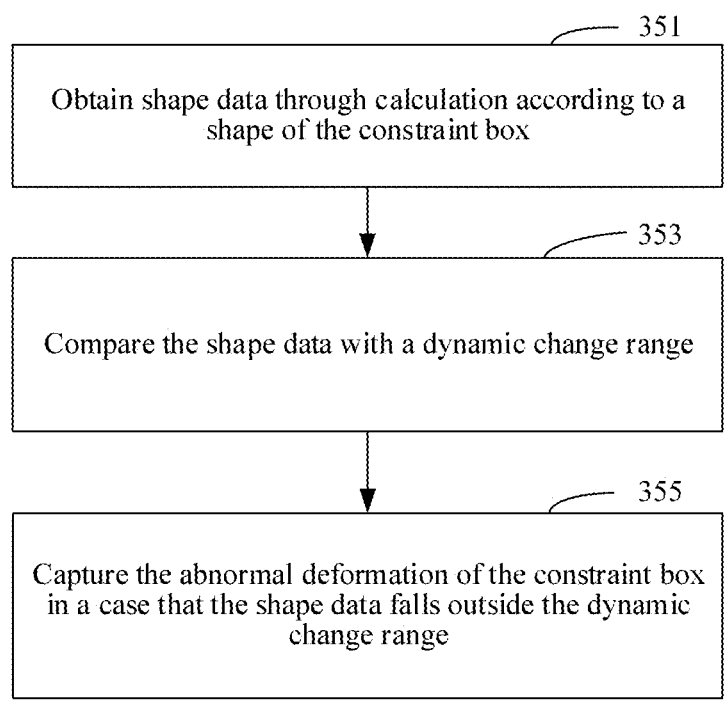
FIG. 6 is a flowchart of an embodiment of step 350 in the embodiment corresponding to FIG. 2.

Referring to FIG. 6, in an exemplary embodiment of this application, step 350 may include the following steps.

In step 351, the method can obtain shape data through calculation according to a shape of the constraint box. As shown in FIG. 4, the shape of the constraint box is a triangle, so that if there is an abnormal deformation of the constraint box, it may be that the position of the triangle offsets obviously, or may be that the triangle is twisted obviously. Therefore, the shape data may refer to coordinates of the constraint box in the image, to represent the position of the constraint box in the image, or may refer to a shape proportion value of the constraint box in the image, to represent the shape of the constraint box in the image.

Figure 7:
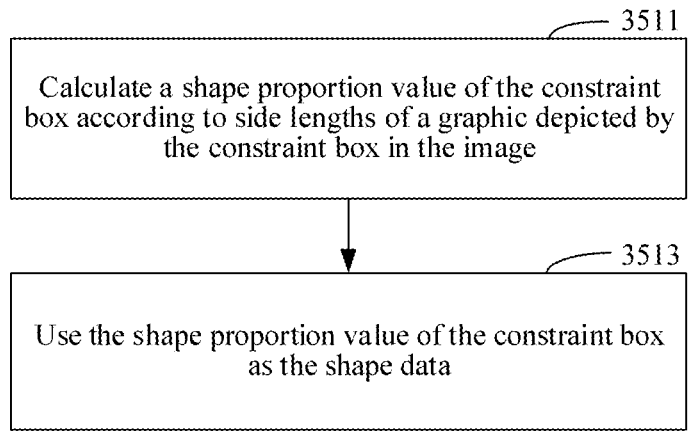
FIG. 7 is a flowchart of an embodiment of step 351 in the embodiment corresponding to FIG. 6.

Specifically, as shown in FIG. 7, if the shape data is a shape proportion value of the constraint box in the image, a calculation process of the shape proportion value may include the following steps.

In step 3511, the method can calculate a shape proportion value of the constraint box according to side lengths of a graphic depicted by the constraint box in the image.

In step 3513, the method can use the shape proportion value of the constraint box as the shape data. For example, when the shape of the constraint box is a triangle, that is, a graphic depicted by the constraint box in the image is a triangle. Therefore, a calculation formula (1) of the shape proportion value of the constraint box is as follows:

$$P = \frac{|a - \bar{a}| + |b - \bar{b}|}{c}, \tag{1}$$

where P represents the shape proportion value of the constraint box, and a, b, and c all represent side lengths of the triangle depicted by the constraint box in the image, and $\bar{a}$ and $\bar{b}$ are known, may be obtained by testing a lot of living body samples, and represent average values of corresponding side lengths of the triangle depicted by the constraint box in a lot of living body samples.

In step 353, the method can compare the shape data with a dynamic change range. The dynamic change range is obtained by testing a lot of living body samples, and reflects a position change range and/or a shape proportion change range of the constraint box in the image when the to-be-detected object is a living body. Alternatively, it may be understood that, if the to-be-detected object is not a prosthesis, the shape data obtained accordingly needs to be within the dynamic change range.

In step 355, the method can capture the abnormal deformation of the constraint box in a case that the shape data falls outside the dynamic change range. Through the coordination of the foregoing embodiments, the shape data is calculated and compared, to be used as a data basis for capturing the abnormal deformation of the constraint box, thereby fully ensuring the accuracy of capturing the abnormal deformation of the constraint box, and further improving the accuracy of the living body detection.

Figure 8:
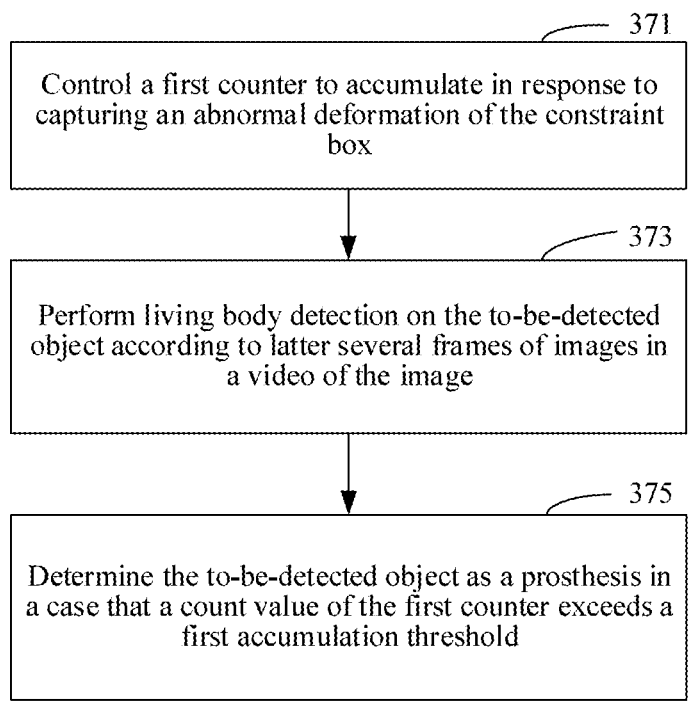
FIG. 8 is a flowchart of an embodiment of step 370 in the embodiment corresponding to FIG. 2.

Referring to FIG. 8, in an exemplary embodiment of this application, step 370 may include the following steps.

In step 371, the method can control a first counter to accumulate in response to capturing an abnormal deformation of the constraint box or detecting no key points. It may be understood that, for different environments of the to-be-detected object and different camera devices, resolutions, lighting conditions, and shooting angles of shot images of the to-be-detected object may be different, and various complex situations may be caused when living body detection is performed on the images of the to-be-detected object, which further causes false detection. Therefore, in this embodiment, to filter out noise or the impact of a sudden shake on the image of the to-be-detected object, a first counter is set, so that the first counter is controlled to accumulate when the abnormal deformation of the constraint box is captured or the constraint box disappears (that is, the key points are not detected).

In step 373, the method can perform living body detection on the to-be-detected object according to latter several frames of images in a video of the image.

In step 375, the method can determine the to-be-detected object as a prosthesis in a case that a count value of the first counter exceeds a first accumulation threshold. In order to avoid false detection, in this embodiment, the image obtaining of the to-be-detected object is for a video. That is, living body detection is performed based on a video of a to-be-detected object. Certainly, in another embodiment, living body detection may alternatively be performed based on a plurality of photos of the to-be-detected object, which is not specifically limited in this embodiment.

It may be understood that, the living body detection is performed by using an image frame as a unit. Therefore, after a current frame of image is detected completely, latter several frames of images in the video are traversed, to perform living body detection on a traversed image.

If an abnormal deformation of the constraint box is captured in the traversed image, the first counter is controlled to accumulate. On the contrary, if no abnormal deformation of the constraint box is captured in the traversed image, latter several frames of images in the video continue to be traversed.

For the image in the video, a current frame of image on which living body detection is being performed may be regarded as a current image, and if the living body detection is completed on the current image, the current image changes to a historical image, and a latter frame of image on which living body detection is performed is updated as a current image.

It should be understood that, for the living body detection performed on the to-be-detected object for the video of the image, reference may be made to the foregoing calculation formula (1) or the following calculation formula (2). Specifically, a calculation formula (2) of the shape proportion value of the constraint box is as follows:

$$P = \frac{|a - a_0| + |b - b_0|}{c}, \quad (2)$$

where P represents the shape proportion value of the constraint box, and a, b, and c all represent side lengths of the triangle depicted by the constraint box in the image, and $a_0$ and $b_0$ represent corresponding side lengths of the triangle depicted by the constraint box in the first frame of image in the video.

Therefore, for the latter several frames of images in the video, shape proportion values of several new constraint boxes constructed accordingly are calculated based on the first frame of image in the video, that is, calculated according to a shape proportion value of a constraint box constructed in the first frame image, to reflect changes of shapes of the several new constraint boxes in the video relative to the shape of the constraint box.

If the changes of the shapes of the several new constraint boxes in the video relative to the shape of the constraint box are smooth, it is regarded that no abnormal deformations of the several new constraint boxes relative to the constraint box are captured. On the contrary, if the changes of the shapes of the several new constraint boxes in the video relative to the shape of the constraint box are abnormal, it is regarded that abnormal deformations of the several new constraint boxes relative to the constraint box are captured, and the first counter is further controlled to accumulate.

Certainly, if any of the several new constraint boxes fails to be constructed, it indicates that there is a prosthesis attack, causing an excessively high image twist degree, and further causing the biometric feature corresponding to the to-be-detected object in the image to be completely destroyed. Consequently, the key point detection fails, the new constraint boxes disappear, and the first counter is also controlled to accumulate. Therefore, when a count value of the first counter exceeds a first accumulation threshold, the to-be-detected object may be determined as a prosthesis, and the possibility of false detection caused by the image itself is ruled out, to improve the accuracy of the living body detection. Through the setting, determining by a relative change is replaced with determining by an absolute change, and false detection is further avoided, to enhance the robustness and stability of the living body detection.

Figure 9:
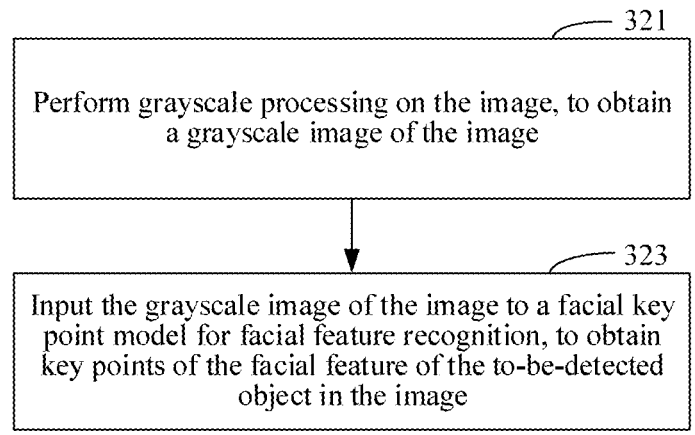
FIG. 9 is a flowchart of an embodiment of step 320 in the embodiment corresponding to FIG. 2.

Referring to FIG. 9, in an exemplary embodiment of this application, the biometric feature of the to-be-detected object is a facial feature. The facial feature includes, but is not limited to: an eyebrow, an eye, a nose, a mouth, an ear, and the like. Correspondingly, step 320 may include the following steps.

In step 321, the method can perform grayscale processing on the image, to obtain a grayscale image of the image.

In step 323, the method can input the grayscale image of the image to a facial key point model for facial feature recognition, to obtain key points of the facial feature of the to-be-detected object in the image. The facial key point model essentially constructs an index relationship for the facial feature in the image, so that key points of a specific facial feature can be located from the image by using the constructed index relationship. Specifically, after the image of the to-be-detected object is inputted to the facial key point model, the key points of the facial feature in the image are marked by indexes. As shown in FIG. 3, indexes marked on six key points of the left and right eyes in the image are 37 to 42 and 43 to 48 respectively, and indexes marked on 20 key points of the mouth in the image are 49 to 68.

In addition, coordinates of the key points marked with indexes in the image are correspondingly stored, and are used as the facial feature to construct an index relationship between the indexes and the coordinates corresponding to the image. Therefore, the coordinates of the key points of the facial feature in the image may be obtained by using the indexes based on the index relationship.

In an embodiment of this application, the facial key point model is generated by performing model training on a specified mathematic model by using massive image samples. The image sample refers to an image marked with an index. The model training is essentially performing iterative optimization on parameters of the specified mathematic model, so that a specified algorithm function constructed by the parameters meets a convergence condition.

The specified mathematic model includes, but is not limited to, a machine learning model such as logistic regression, a support vector machine, a random forest, and a neural network. The specified algorithm function includes, but is not limited to, a maximum expectation function, a loss function, and the like.

For example, the parameters of the specified mathematic model are randomly initialized, and a loss value of a loss function constructed by the randomly initialized parameters is calculated according to a current image sample.

If the loss value of the loss function does not reach a minimum value, the parameters of the specified mathematic model are updated, and a loss value of a loss function constructed by the updated parameters is calculated according to a latter image sample. The iteration loops in this way until the loss value of the loss function reaches the minimum value. In this case, it is regarded that the loss function converges, so that the specified mathematic model converges into a facial key point model, and the iteration stops. Otherwise, the parameters of the specified mathematic model are iteratively updated, and a loss value of a loss function constructed by the updated parameters is iteratively calculated according to rest image samples, until the loss function converges.

It should be noted that, if before the loss function converges, the number of iterations has reached an iterative threshold, and the iteration also stops, to ensure the model training efficiency.

As can be known from the above, the facial key point model that completes the model training may be used to rapidly obtain several key points of the facial feature in the image in real time, to fully ensure the timeliness of the living body detection. In addition, based on the facial key point model, the facial feature recognition for different facial expressions has better accuracy and stability, to fully ensure the accuracy of the living body detection. After the key points of the facial feature of the to-be-detected object in the image are located, several key points may be selected from the key points, to construct a constraint box in the image to participate in the living body detection.

Figure 10:
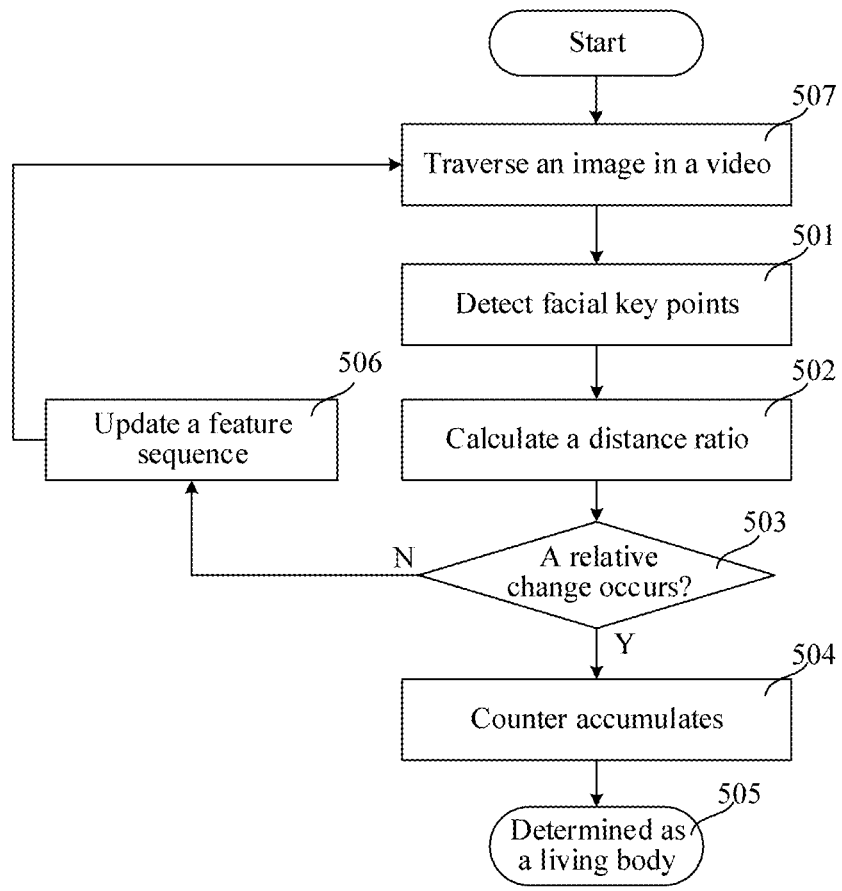
FIG. 10 is a flowchart of another living body detection method according to an exemplary embodiment.

Referring to FIG. 10, in an exemplary embodiment of this application, the living body detection process may further include the following steps.

In step 501, the process can locate key points of the biometric feature of the to-be-detected object in the image. Facial feature recognition using a facial key point detection model is described by using an example in which the biometric feature of the to-be-detected object is a facial feature. As shown in FIG. 3, the facial feature in the image has 68 key points, specifically including: six key points 37 to 42 and 43 to 48 of the left and right eyes in the image, 20 key points 49 to 68 of the mouth in the image, and the like.

In step 502, the process can calculate, according to the key points of the biometric feature of the to-be-detected object in the image, a biometric feature structure distance ratio corresponding to the image. The biometric feature of the to-be-detected object, for example, may be a face, an eye, a mouth, a hand, a foot, a fingerprint, or an iris. It may be understood that, for different biometric features of the to-be-detected object, structures of the biometric features in images are different, so that biometric feature structure distance ratios corresponding to the images are also different.

For example, if the biometric feature of the to-be-detected object is an eye, the biometric feature structure distance ratio corresponding to the image is an eye aspect ratio, to describe the structure of the eye of the to-be-detected object in the image; and if the biometric feature of the to-be-detected object is a mouth, the biometric feature structure distance ratio corresponding to the image is a mouth aspect ratio, to describe the structure of the mouth of the to-be-detected object in the image.

Herein, the biometric feature structure distance ratios corresponding to the images are not listed one by one. Different to-be-detected objects have corresponding images, and further have biometric feature structure distance ratios corresponding to the corresponding images, so as to accurately describe structures of biometric features of the different to-be-detected objects in the corresponding images.

Figure 11:
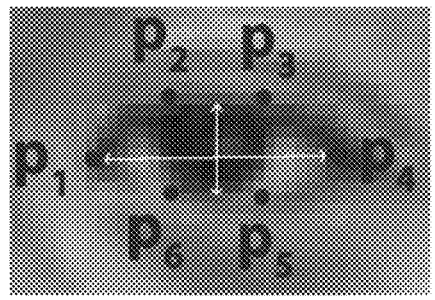
FIG. 11 is a schematic diagram of key points of an eye in an image involved in the embodiment corresponding to FIG. 10.

Description is made by using an example in which the biometric feature of the to-be-detected object is an eye. As shown in FIG. 11, the eye aspect ratio corresponding to the image may be calculated by using the six key points of the eye in the image, to further reflect the structure of the eye in the image. Specifically, a calculation formula of the eye aspect ratio is shown in (3):

$$EAR = \frac{\|p_2 - p_6\| + \|p_3 - p_5\|}{2\|p_1 - p_4\|}, \quad (3)$$

where EAR represents an eye aspect ratio, $p_1$ represents coordinates of a key point of the right canthus, $p_2$ and $p_3$ separately represent coordinates of key points of the upper eyelid, $p_4$ represents coordinates of a key point of the left canthus, and $p_5$ and $p_6$ separately represent coordinates of key points of the lower eyelid, $\|p1-p4\|$ represents a norm of a coordinate difference between a pair of key points of the left and right canthi, likewise, $\|p2-p6\|$ represents a norm of a coordinate difference between a pair of key points of the upper and lower eyelids, and $\|p3-p5\|$ represents a norm of a coordinate difference between the other pair of key points of the upper and lower eyelids.

In the calculation formula (3), the numerator represents a vertical distance between the upper and lower eyelids of the eye, and the denominator represents a horizontal distance between the left and right canthi of the eye. The numerator includes two sets of vertical distances, and the denominator merely includes one set of horizontal distances. Therefore, the denominator is weighted, that is, multiplied by 2.

In step 503, the process can capture an action behavior of the to-be-detected object according to a change of the biometric feature structure distance ratio corresponding to the image relative to biometric feature structure distance ratios in a feature sequence. The biometric feature structure distance ratios in the feature sequence are calculated according to previous several frames of historical images in the video of the image. Therefore, the feature sequence essentially reflects a normal structure of the biometric feature of the to-be-detected object in historical images. Alternatively, it may be understood that, the feature sequence is used for accurately describing a normal structure of the biometric feature of the to-be-detected object in a historical image acquisition time period.

Therefore, if the biometric feature structure distance ratio corresponding to the image changes relative to the biometric feature structure distance ratios corresponding to the historical images in the feature sequence, it indicates that the structure of the biometric feature of the to-be-detected object in the image changes relative to the normal structure of the biometric feature of the to-be-detected object described in the feature sequence in the historical image acquisition time period.

Description is made still by using an example in which the biometric feature of the to-be-detected object is an eye, and the normal structure is an eye contour when the eye opens. Therefore, the changed structure is an eye contour when the eye blinks. The action behavior of the to-be-detected object includes, but is not limited to a blink behavior, a mouth open behavior, a mouth close behavior, a wave behavior, a stamp behavior, and the like.

As can be known from the above, for the video of the image, when a biometric feature structure distance ratio corresponding to the image changes relative to biometric feature structure distance ratios corresponding to previous several historical images, it indicates that a biometric feature contour of the to-be-detected object in the image changes. For example, the to-be-detected object blinks. In this case, it is regarded that an action behavior of the to-be-detected object is captured, and further the to-be-detected object is determined as a living body.

In step 504, the process can control a second counter to accumulate in response to capturing the action behavior of the to-be-detected object. It may be understood that, during image acquisition of the to-be-detected object, the to-be-detected object may close eyes during photo shooting, but not actually blink. Therefore, in this embodiment, a second counter is set, and it is regarded that the to-be-detected object is a living body only when a count value accumulated in the second counter exceeds a second accumulation threshold, that is, step 505 is performed. Therefore, the possibility of false detection of a living body caused by a change of a biometric feature structure of the image itself is further ruled out.

In step 505, the process can determine the to-be-detected object as a living body in a case that a count value of the second counter exceeds a second accumulation threshold. For example, when a blink behavior, a mouth open behavior, a mouth close behavior, a wave behavior, a stamp behavior, or the like of the to-be-detected object is captured, the to-be-detected object may be determined as a living body.

Through the foregoing process, on the premise of ruling out the to-be-detected object being a prosthesis by using a constraint box, a living body detection solution based on a relative change of a biometric feature structure distance ratio is further implemented. That is, for the video of the to-be-detected object, the to-be-detected object is determined as a living body only when a biometric feature structure distance ratio corresponding to one frame of image changes relative to biometric feature structure distance ratios corresponding to previous several frames of images, to filter mistakenly determining a prosthesis caused by an abrupt change of a biometric feature contour in a prosthesis attack sample, thereby effectively improving the defense of the living body detection method against the prosthesis attack sample, and providing higher security.

In addition, the prosthesis attack sample means that a contour of an eye or a mouth in the image of the to-be-detected object is altered or covered by an attacker, causing a phenomenon such as a prosthesis blinking or closing mouth.

In step 506, the process can add the biometric feature structure distance ratio corresponding to the image to the feature sequence in response to not capturing the action behavior of the to-be-detected object. Specifically, the biometric feature structure distance ratio corresponding to the image is compared with a normal structure interval; and the biometric feature structure distance ratio corresponding to the image is added to the feature sequence in a case that the biometric feature structure distance ratio corresponding to the image is within the normal structure interval.

It is to be understood that, for the same to-be-detected object, the structure of the biometric feature is relatively fixed. Therefore, the structure of the biometric feature of the to-be-detected object in the image is also relatively fixed, and is regarded as a normal structure. For example, if the biometric feature of the to-be-detected object is an eye, an eye contour when the eye opens is regarded as a normal structure.

The normal structure interval represents a fluctuation range of the normal structure of the biometric feature of the to-be-detected object in the image. The normal structure interval may be flexibly set according to an actual requirement of an application scenario. For example, in an application scenario with a higher precision requirement, a normal structure interval having a narrower fluctuation range is set, which is not limited in this embodiment. Therefore, the biometric feature structure distance ratio corresponding to the image is allowed to be added to the feature sequence only when the biometric feature structure distance ratio is within the normal structure interval, to prevent an abnormal biometric feature structure distance ratio in the feature sequence, and fully ensure the accuracy of the feature sequence, thereby further improving the accuracy of the living body detection. In a specific implementation of an embodiment of this application, the feature sequence is a queue of a specified length.

Figure 12:
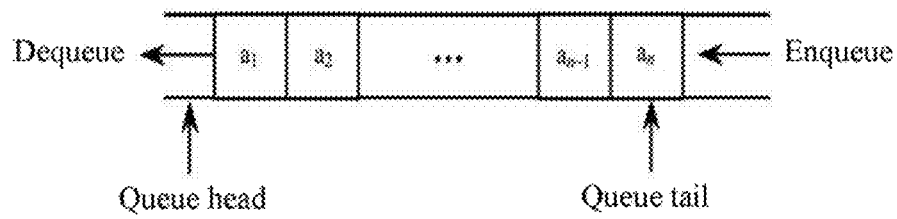
FIG. 12 is a schematic diagram of a specific implementation of an enqueue operation/dequeue operation performed by a queue for a biometric feature structure distance ratio corresponding to an image involved in the embodiment corresponding to FIG. 10.

As shown in FIG. 12, a queue of a specified length N includes N storage positions, and each storage position may be used for storing a biometric feature structure distance ratio meeting a normal structure interval.

The specified length of the queue may be flexibly adjusted according to an actual requirement of an application scenario. For example, for an application scenario in which a requirement for precision is higher, if there are more images of the to-be-detected object, a larger specified length is set, and for an application scenario in which a requirement for a storage space of an electronic device is higher, a smaller specified length is set. This is not limited in this embodiment.

Assuming that there are 2n images of the to-be-detected object, a biometric feature structure distance ratio corresponding to each image is $a_i$, where $1 \leq i \leq 2n$. When the queue is empty, if the first biometric feature structure distance ratio $a_i$ meets the normal structure interval, the biometric feature structure distance ratio $a_1$ is stored to the first storage position in the queue. When the queue is not full, if the second biometric feature structure distance ratio $a_2$ meets the normal structure interval, the biometric feature structure distance ratio $a_2$ is stored to the second storage position in the queue, to complete the enqueue operation of the biometric feature structure distance ratio $a_2$.

By analogy, if an $N^{th}$ biometric feature structure distance ratio $a_n$ meets the normal structure interval, the biometric feature structure distance ratio $a_n$ is stored to an $N^{th}$ storage position in the queue, and in this case, the queue is full.

When the queue is full, if an $(N+1)^{th}$ biometric feature structure distance ratio $a_{n+1}$ meets the normal structure interval, to uphold the "first-in first-out" principle, the first biometric feature structure distance ratio $a_1$ is moved out of the queue from the queue head, and the second biometric feature structure distance ratio $a_2$ is moved to the first storage position along a queue head direction. By analogy, the $N^{th}$ biometric feature structure distance ratio an is moved to an $(N-1)^{th}$ storage position along the queue head direction, thereby completing the dequeue operation. In this case, if the $N^{th}$ storage position in the queue is empty, the $(N+1)^{th}$ biometric feature structure distance ratio $a_{n+1}$ is stored to the $N^{th}$ storage position from the queue tail, to complete the enqueue operation of the biometric feature structure distance ratio $a_{n+1}$.

As can be known from the above, as the images of the to-be-detected object are continuously acquired, due to the limited storage positions in the queue, the biometric feature structure distance ratios stored in the queue are updated accordingly in real time, to achieve a sliding window filtering effect, and fully ensure the accuracy of a normal structure of a biometric feature of the to-be-detected object described in the queue in the historical image acquisition time period.

Through the setting, the living body detection method based on a queue is implemented, which not only can effectively filter mistakenly determining a prosthesis as a living body caused by an abrupt change of a biometric feature structure in a prosthesis attack sample, but also can be applied to groups with different facial features. That is, biometric feature structure distance ratios in different queues may reflect normal structures of different facial features, so that the living body detection method has good adaptability and universality.

In step 507, the process can traverse latter several frame images in the video. If the living body detection is completed on the current image, latter several frames of images in the video continue to be traversed, until the to-be-detected object is detected as a prosthesis, or all images in the video are detected completely, and the to-be-detected object is determined as a living body.

Figure 13:
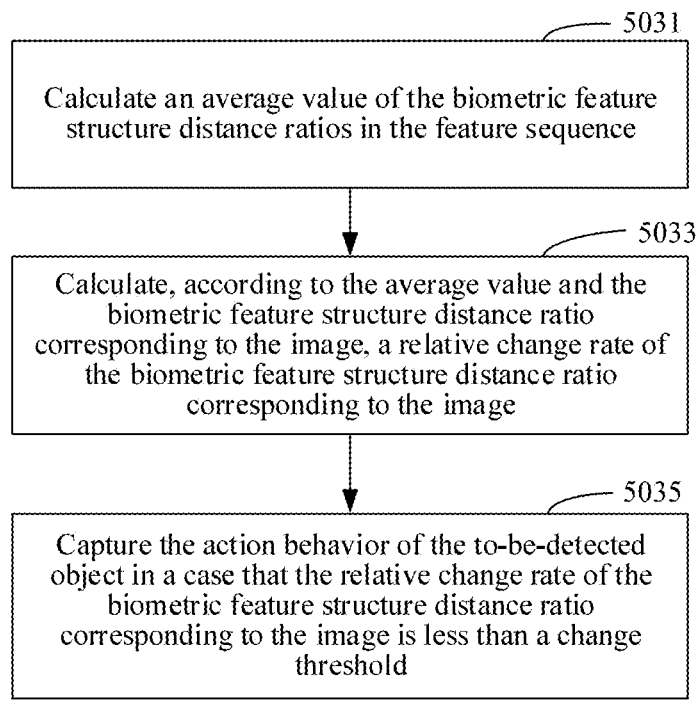
FIG. 13 is a flowchart of an embodiment of step 503 in the embodiment corresponding to FIG. 10.

Further, referring to FIG. 13, in an exemplary embodiment of this application, step 503 may include the following steps.

In step 5031 the process can calculate an average value of the biometric feature structure distance ratios in the feature sequence.

In step 5033, the process can calculate, according to the average value and the biometric feature structure distance ratio corresponding to the image, a relative change rate of the biometric feature structure distance ratio corresponding to the image.

Figure 14:
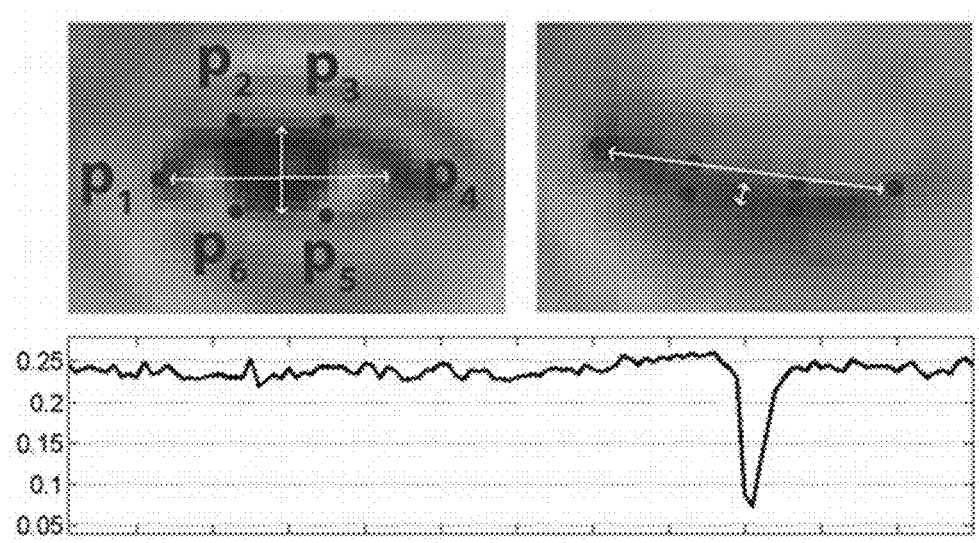
FIG. 14 is a schematic diagram of a change trend of an eye aspect ratio involved in the embodiment corresponding to FIG. 13.

By using an eye aspect ratio as an example, as shown in FIG. 14, when the eye opens, the eye aspect ratio is roughly constant, and only fluctuates around a range 0.25. Once the eye blinks and closes, because the vertical distance is almost zero, the eye aspect ratio is correspondingly reduced to zero. When the eye opens again, the eye aspect ratio rises to the range 0.25 again. That is, whether the eye blinks is determined by recording a change trend of the eye aspect ratio in the image acquisition time period.

It may be understood that, for a living body, an action behavior of the living body may be captured sensitively by using the eye aspect ratio. However, if an attacker covers an eye contour in the image quickly and continuously for many times, because several key points of the eye in the image are damaged, a case that the eye aspect ratio is less than the determining threshold is easily caused, causing a prosthesis to be mistakenly determined as a living body.

In addition, another case exists in the mistaken determining, that is, a living body is mistakenly determined as a prosthesis.

For the image of the to-be-detected object, if the eye itself in the image is relatively small, a probability that the eye aspect ratio jumps obviously is greatly reduced. An extreme case may occur when the to-be-detected object opens eyes, the eye aspect ratio corresponding to the image is already less than the determining threshold, causing a failure in detecting the obvious jump of the eye aspect ratio during the blinking of the to-be-detected object, and a living body to be mistakenly determined as a prosthesis.

Therefore, in this embodiment, the living body detection method is implemented according to the relative change of the biometric feature structure of the to-be-detected object in the image, as shown in the following formula (4):

$$\alpha = \frac{Ear' - \text{Ear\_ave}}{\text{Ear\_ave}}, \qquad (4)$$

where $\alpha$ represents a relative change rate of a biometric feature structure distance ratio corresponding to a current image, Ear_ave represents an average value of biometric feature structure distance ratios in a feature sequence, and Ear' represents the biometric feature structure distance ratio corresponding to the current image. That is, Ear_ave is used for reflecting a normal structure of the biometric feature of the to-be-detected object in a historical image acquisition time period. The Ear' is used for reflecting the structure of the biometric feature of the to-be-detected object in a current image acquisition time period.

Because the historical image acquisition time period and the current image acquisition time period are continuous, if the relative change rate $\alpha$ is not zero, it indicates that in the same time period in which the images of the to-be-detected image are acquired, the structure of the biometric feature reflected by Ear' changes relative to the normal structure of the biometric feature reflected by Ear_ave. Therefore, the to-be-detected object may have an action behavior.

In step 5035, the process can capture the action behavior of the to-be-detected object in a case that the relative change rate of the biometric feature structure distance ratio corresponding to the image is less than a change threshold.

As described above, when the relative change rate $\alpha$ is not zero, the to-be-detected object may have an action behavior. Therefore, in this embodiment, the change threshold is set, that is, it is regarded that the action behavior of the to-be-detected object is captured only when the relative change rate $\alpha$ is less than the set change threshold.

Herein, the change threshold may be flexibly set according to an actual requirement of an application scenario. For example, a smaller change threshold is set for an application scenario in which a requirement for detection sensitivity is higher, which is not limited in this embodiment.

In the foregoing process, the relative change determining is replaced with the absolute change determining, to avoid the defect that the living body is mistakenly determined as a prosthesis caused by different action behavior amplitudes of different structures of biometric features, for example, a blink amplitude of a small eye is less than a blink amplitude of a large eye, thereby enhancing the robustness and stability of the living body detection.

In an exemplary embodiment of this application, after step 506, the method may further include the step of calling, in a case that the to-be-detected object is a living body, a facial recognition model to perform facial recognition on an image of the to-be-detected object.

The face recognition process is described below with reference to specific application scenarios.

Figure 15:
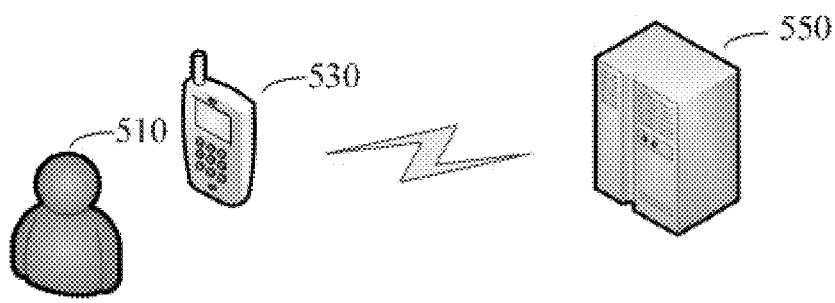
FIG. 15 is a schematic diagram of an implementation environment based on identity authentication in an application scenario.

FIG. 15 is a schematic diagram of an implementation environment based on identity authentication in an application scenario. As shown in FIG. 15, in the application scenario, the implementation environment includes a payment user 510, a smartphone 530, and a payment server 550.

For a to-be-paid order, the payment user 510 performs face swiping by using a camera configured in the smartphone 530, so that the smartphone 530 obtains a to-berecognized user image corresponding to the payment user 510, and further performs facial recognition on the to-be-recognized user image by using a facial recognition model. Specifically, a user feature of the to-be-recognized user image is extracted by using the facial recognition model, and a similarity between the user feature and a specified user feature is calculated. If the similarity is greater than a similarity threshold, the payment user 510 passes identity authentication. The specified user feature is pre-extracted for the payment user 510 by the smartphone 530 by using the facial recognition model. After the payment user 510 passes the identity authentication, the smartphone 530 initiates an order payment request to the payment server 550 for the to-be-paid order, to complete a payment process of the to-be-paid order.

Figure 16:
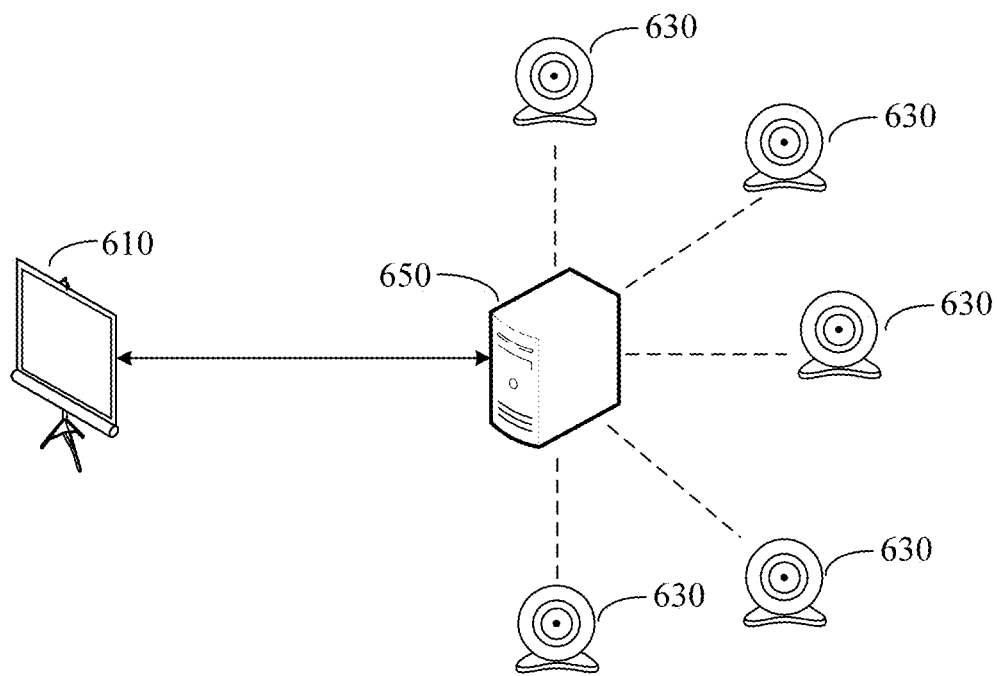
FIG. 16 is a schematic diagram of an implementation environment based on identity recognition in an application scenario.

FIG. 16 is a schematic diagram of an implementation environment based on identity recognition in an application scenario. For example, in video surveillance, through identity recognition, a tracked target is determined in a plurality of facial images displayed on image pictures. Many-to-one feature matching is implemented in the application scenario, and may be regarded as a special case of one-to-one feature matching.

As shown in FIG. 16, in the application scenario, the implementation environment includes a surveillance screen 610, cameras 630 distributed everywhere, and a surveillance server 650 for implementing interactions between the camera 630 and the surveillance screen 610.

In the application scenario, a lot of cameras 630 are distributed indoors and outdoors, so as to implement video surveillance at any time by using image pictures acquired by the camera 630. Specifically, a lot of distributed cameras 630 form a video surveillance system, and image pictures are obtained through interactions between the surveillance server 650 and the cameras 630 in the video surveillance system, to further implement video surveillance for the tracked target in the surveillance screen 610 by using the image pictures.

Facial recognition of a monitored object in an image picture to determine a tracked target is completed by the surveillance server 650. Specifically, facial features of a plurality of facial images in the image pictures are extracted by using the facial recognition model, and similarities between the facial features and a specified target feature are calculated separately. The specified target feature is pre-extracted based on the tracked target by using the facial recognition model.

Therefore, a facial feature with a maximum similarity that exceeds a similarity threshold can be obtained, and further an identity of the monitored object is determined as an identity associated with the facial feature with the maximum similarity that exceeds the similarity threshold, to recognize the tracked target in the image pictures, to facilitate continuous tracking for the tracked target subsequently. Because not all image pictures have the tracked target, for the facial feature with the maximum similarity, similarities need to be further compared to ensure the accuracy of the continuous tracking.

Figure 17:
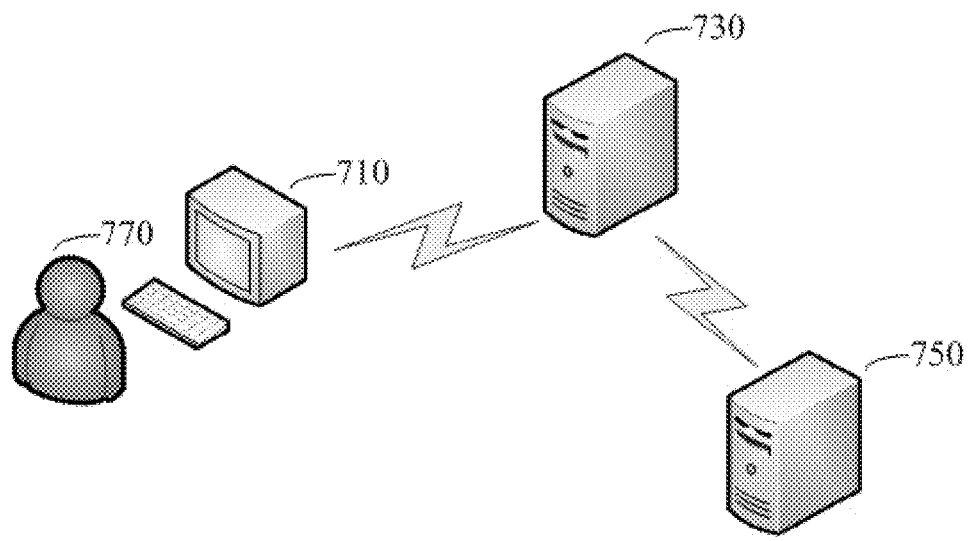
FIG. 17 is a schematic diagram of another implementation environment based on identity recognition in an application scenario.

FIG. 17 is a schematic diagram of another implementation environment based on identity recognition in an application scenario. As shown in FIG. 17, the implementation environment includes a reception device 710, a recognition server 730, and an access control device 750.

A camera is installed on the reception device 710, to take facial photos of an access object 770, and send an obtained to-be-recognized personnel image of the access object 770 to the recognition server 730 for facial recognition. In the application scenario, the access object 770 includes work personnel and a visitor.

The recognition server 730 extracts a personnel feature of the to-be-recognized personnel image by using the facial recognition model, calculates similarities between the personnel feature and a plurality of specified personnel features, to obtain a specified personnel feature with a highest similarity, and further determines a personnel identity associated with the specified personnel feature with the highest similarity as an identity of the access object 770, to complete identity recognition of the access object 770. The specified personnel feature is pre-extracted by the recognition server 730 for the access object 770 by using the facial recognition model.

After the identity recognition of the access object 770 is completed, the recognition server 730 sends an access authorization instruction to the access control device 750 for the access object 770, so that the access control device 750 configures a corresponding access permission for the access object 770 according to the access authorization instruction, and further the access object 770 controls, by using the access permission, an access barrier of a specified work region to perform a release action. Certainly, in different application scenarios, flexible deployment may be performed according to an actual application requirement. For example, the recognition server 730 and the access control device 750 may be deployed as one server, or the reception device 710 and the access control device 750 are deployed as one server, which is not limited in the application scenario.

In the foregoing three application scenarios, the living body detection apparatus may be used as a precursor module of facial recognition.

Figure 18:
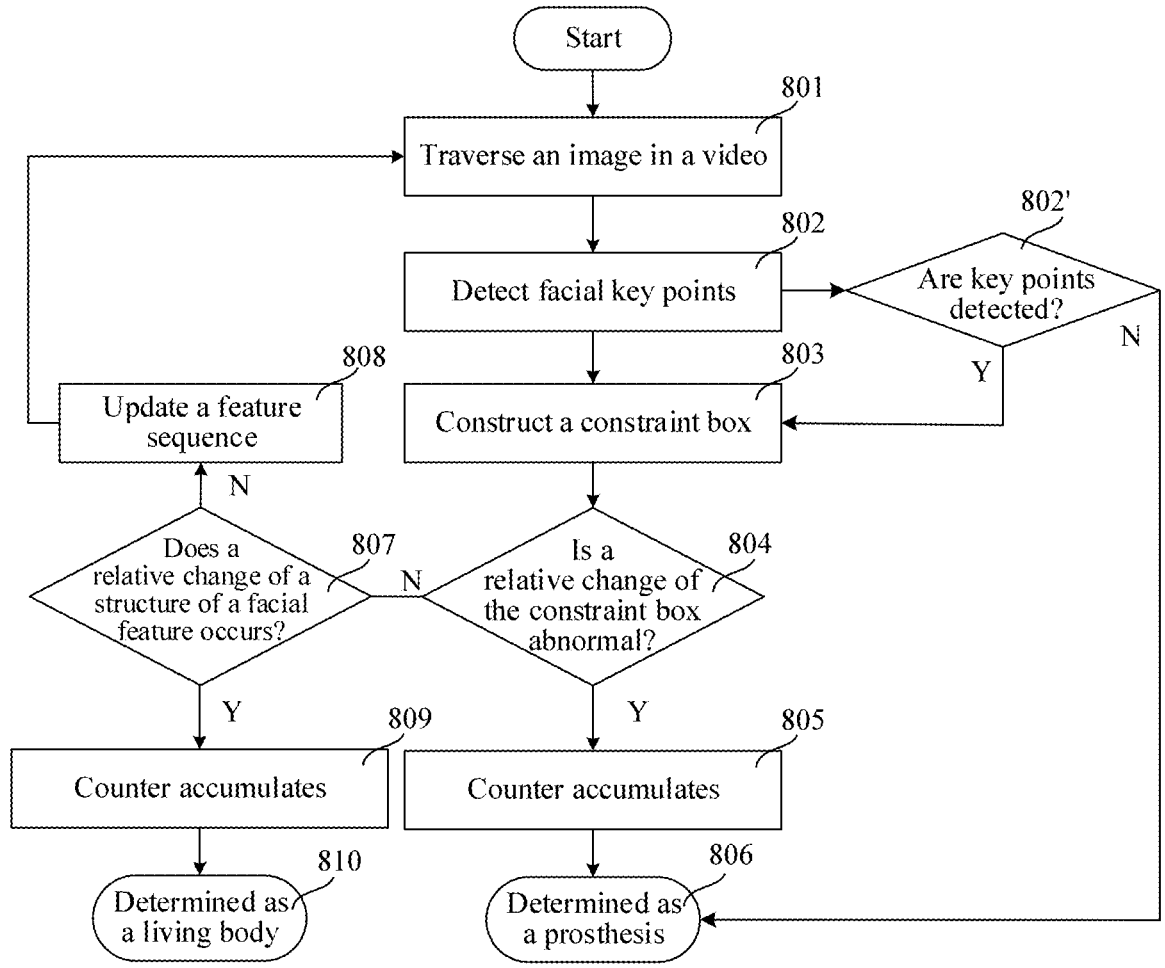
FIG. 18 is a schematic diagram of a specific implementation of a living body detection method in an application scenario.

As shown in FIG. 18, by performing step 801 to step 806, first, prosthesis determining is performed on the to-be-detected object based on the constraint box. Whether the constraint box has an abnormal relative change or the constraint box disappears, it is regarded that there is a prosthesis attack, and the to-be-detected object is determined as a prosthesis. Then, by performing step 807 to step 810, whether the to-be-detected object is a living body is further determined according to whether the face feature structure of the to-be-detected object changes relatively.

Therefore, the living body detection apparatus can accurately determine whether the to-be-detected object is a living body, and further implement defense against a prosthesis attack, which not only can fully ensure security of the identity authentication/identity recognition, but also can effectively relieve work pressure and traffic pressure of the later facial recognition, thereby better providing convenience for various facial recognition tasks.

In addition, the computer program volume involved in the living body detection apparatus is light, and hardware configuration requirements for the electronic device are simple. The apparatus is not only applicable to a smartphone, but also applicable to a server configured with a Windows operating system and a Linux operating system, thereby fully improving the universality and practicality of the living body detection method.

The following is an apparatus embodiment of this application. The apparatus may be configured to perform the living body detection method in any embodiment of this application. For details not disclosed in the apparatus embodiment of this application, refer to the method embodiment of the living body detection method involved in this application.

Figure 19:
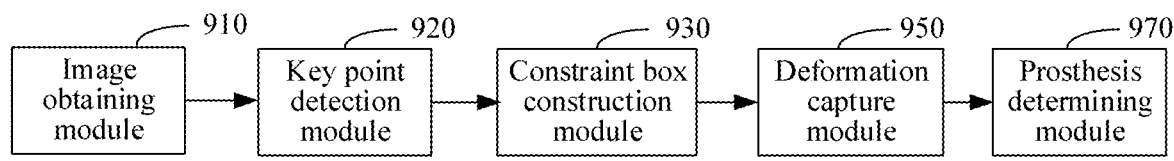
FIG. 19 is a block diagram of a living body detection apparatus according to an exemplary embodiment.

Referring to FIG. 19, in an exemplary embodiment of this application, a living body detection apparatus 900 includes, but is not limited to, an image obtaining module 910, a key point detection module 920, a constraint box construction module 930, a deformation capture module 950, and a prosthesis determining module 970.

The image obtaining module 910 is configured to obtain an image of a to-be-detected object. The key point detection module 920 is configured to perform key point detection on a biometric feature corresponding to the to-be-detected object in the image. The constraint box construction module 930 is configured to construct a constraint box in the image according to detected key points. The deformation capture module 950 is configured to capture a shape change of the constraint box constructed in the image.

The prosthesis determining module 970 is configured to determine the to-be-detected object as a prosthesis in response to capturing an abnormal deformation of the constraint box or detecting no key points. In an exemplary embodiment, the deformation capture module can include a data calculation unit, configured to obtain shape data through calculation according to a shape of the constraint box, a data comparison unit, configured to compare the shape data with a dynamic change range, and an anomaly capture unit, configured to capture the abnormal deformation of the constraint box in a case that the shape data falls outside the dynamic change range.

In an exemplary embodiment, the data calculation unit can include a proportion calculation subunit, configured to calculate a shape proportion value of the constraint box according to side lengths of a graphic depicted by the constraint box in the image, and a data definition subunit, configured to use the shape proportion value of the constraint box as the shape data.

In an exemplary embodiment, the prosthesis determining module can include an accumulation unit, configured to control a first counter to accumulate in response to capturing an abnormal deformation of the constraint box or detecting no key points; an image traversal unit, configured to perform living body detection on the to-be-detected object according to latter several frames of images in a video of the image; and a prosthesis determining unit, configured to determine the to-be-detected object as a prosthesis in a case that a count value of the first counter exceeds a first accumulation threshold.

In an exemplary embodiment, the image traversal unit includes: a new constraint box construction subunit, configured to construct several new constraint boxes according to the latter several frames of images in the video of the image, each of the new constraint boxes corresponding to a latter frame of image; a tracking subunit, configured to track the constraint box constructed in the image according to the several new constraint boxes; a relative change monitoring subunit, configured to monitor, through the tracking, changes of the several new constraint boxes relative to the constraint box in the video of the image; and an accumulation subunit, configured to control the first counter to accumulate in response to detecting an abnormal relative change or a construction failure of any of the new constraint boxes.

In an exemplary embodiment, the biometric feature of the to-be-detected object is a facial feature, and the key point detection module also can include a grayscale processing unit, configured to perform grayscale processing on the image, to obtain a grayscale image of the image; and a model calling unit, configured to input the grayscale image of the image to a facial key point model for facial feature recognition, to obtain key points of the facial feature of the to-be-detected object in the image.

In an exemplary embodiment, the apparatus can further include a distance ratio calculation module that is configured to calculate, according to the key points of the biometric feature of the to-be-detected object in the image, a biometric feature structure distance ratio corresponding to the image in response to not capturing an abnormal deformation of the constraint box; a behavior capture module that is configured to capture an action behavior of the to-be-detected object according to a change of the biometric feature structure distance ratio corresponding to the image relative to biometric feature structure distance ratios in a feature sequence, the biometric feature structure distance ratios in the feature sequence being calculated according to previous several frames of historical images in the video of the image, and a living body determining module that is configured to determine the to-be-detected object as a living body in response to capturing the action behavior of the to-be-detected object.

In an exemplary embodiment, the behavior capture module can include an average value calculation unit that is configured to calculate an average value of the biometric feature structure distance ratios in the feature sequence, and a change rate calculation unit that is configured to calculate, according to the average value and the biometric feature structure distance ratio corresponding to the image, a relative change rate of the biometric feature structure distance ratio corresponding to the image. The behavior capture module can further include a determining unit that is configured to capture the action behavior of the to-be-detected object in a case that the relative change rate of the biometric feature structure distance ratio corresponding to the image is less than a change threshold.

In an exemplary embodiment, the determining unit can further include an accumulation subunit that is configured to control a second counter to accumulate in response to capturing the action behavior of the to-be-detected object, and a determining subunit that is configured to determine the to-be-detected object as a living body in a case that a count value of the second counter exceeds a second accumulation threshold.

In an exemplary embodiment, the apparatus further includes a distance ratio comparison module that is configured to compare the biometric feature structure distance ratio corresponding to the image with a normal structure interval, and a distance ratio adding module that is configured to add the biometric feature structure distance ratio corresponding to the image to the feature sequence in a case that the biometric feature structure distance ratio corresponding to the image is within the normal structure interval.

In an exemplary embodiment, the feature sequence is a queue of a specified length, and the distance ratio adding module can further include a first enqueue unit that is configured to control, in a case that the queue is not full, the queue to perform an enqueue operation for the biometric feature structure distance ratio corresponding to the image, and a second enqueue unit, configured to control, in a case that the queue is full, the queue to perform a dequeue operation at a queue head, and perform an enqueue operation for the biometric feature structure distance ratio corresponding to the image at a queue tail.

In an exemplary embodiment, the biometric feature of the to-be-detected object includes an eye and/or a mouth, and the biometric feature structure distance ratio includes an eye aspect ratio and/or a mouth aspect ratio.

In an exemplary embodiment, the apparatus can further include a facial recognition module that is configured to call, in a case that the to-be-detected object is determined as a living body, a facial recognition model to perform facial recognition on the image of the to-be-detected object.

When the living body detection apparatus provided in the foregoing embodiment performs living body detection, the division of the functional modules is merely used as an example for description. In the practical application, the functions may be distributed to and implemented by different functional modules according to the requirements, that is, an internal structure of the living body detection apparatus is divided into different functional modules, so as to finish all or some of the functions described above.

In addition, the living body detection apparatus provided in the foregoing embodiment and the embodiments of the living body detection method belong to the same idea. Specific operation manners of the modules have been described in detail in the method embodiments, and details are not described herein again.

Figure 20:
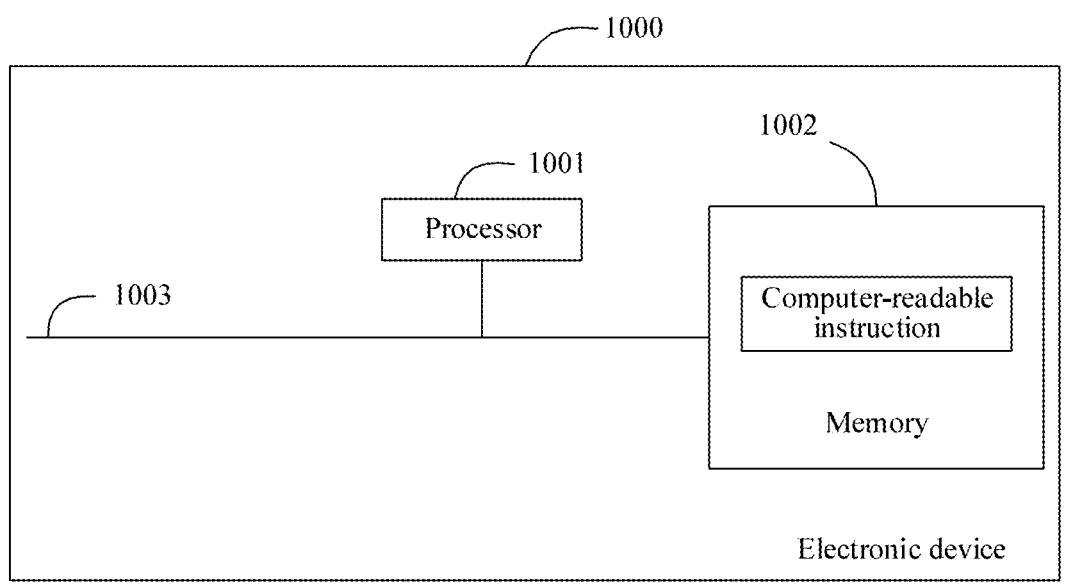
FIG. 20 is a block diagram of an electronic device according to an exemplary embodiment.

Referring to FIG. 20, in an exemplary embodiment of this application, an electronic device 1000 includes at least one processor 1001, at least one memory 1002, and at least one communication bus 1003.

The memory 1002 stores non-transitory computer-readable instructions, and the processor 1001 reads, by using the communication bus 1003, the computer-readable instructions stored in the memory 1002. The computer-readable instructions, when executed by the processor 1001, implementing the living body detection method in the foregoing embodiments.

In an exemplary embodiment of this application, a computer-readable storage medium stores a computer program, the computer program, when executed by a processor, implements the living body detection method in the foregoing embodiments.

The foregoing descriptions are merely exemplary embodiments of this application, and are not intended to limit the implementations of the embodiments of this application. A person of ordinary skill in the art can easily make corresponding modifications or variations according to the main idea and spirit of the embodiments of this application. Therefore, the protection scope of the embodiments of this application shall be subject to the protection scope of the claims.

What is claimed is:

1. A living body detection method that is performed by an electronic device, the method comprising:
   obtaining an image of a to-be-detected object;
   performing key point detection on a biometric feature corresponding to the to-be-detected object in the image;
   constructing a constraint box based on detected key points of the biometric feature;
   obtaining a shape proportion value of the constraint box through calculation based on side lengths of a shape of the constraint box;
   comparing the shape proportion value and a dynamic change range;
   capturing a shape change of the constraint box based on the comparison of the shape proportion value of the side lengths of the constraint box and the dynamic change range; and
   determining the to-be-detected object as a prosthesis when an abnormal deformation of the constraint box is detected in the captured shape change of the constraint box or no key points of the constraint box are detected,
   wherein the abnormal deformation of the constraint box is detected in the captured shape change of the constraint box based on the shape proportion value falling outside the dynamic change range of the constraint box that is associated with a type of the biometric feature and indicates whether the to-be-detected object is the prosthesis.

2. The method according to claim 1, wherein the determining the to-be-detected object as the prosthesis further comprises:
   controlling a first counter to accumulate when the abnormal deformation of the constraint box is detected in the captured shape change of the constraint box or no key points of the constraint box is detected;
   performing living body detection on the to-be-detected object based on latter frames of images in a video of the image; and
   determining the to-be-detected object as the prosthesis when a count value of the first counter exceeds a first accumulation threshold.

3. The method according to claim 2, wherein the performing the living body detection on the to-be-detected object further comprises:
   constructing new constraint boxes based on the latter frames of images in the video of the image, wherein each of the new constraint boxes corresponds to a latter frame of image;
   tracking the constraint box based on the new constraint boxes;
   monitoring, through the tracking, changes of the new constraint boxes relative to the constraint box in the video of the image; and
   controlling the first counter to accumulate when an abnormal relative change is detected or a construction failure of any of the new constraint boxes occurs.

4. The method according to claim 1, wherein:
   the biometric feature of the to-be-detected object is a facial feature, and
   the performing the key point detection on the biometric feature further comprises:
      performing grayscale processing on the image to obtain a grayscale image of the image; and
      inputting the grayscale image of the image to a facial key point model for facial feature recognition to obtain the key points of the facial feature of the to-be-detected object in the image.

5. The method according to claim 1, further comprising:
   calculating a biometric feature structure distance ratio corresponding to the image when the abnormal deformation of the constraint box based on the key points of the biometric feature of the to-be-detected object in the image is not detected;
   capturing an action behavior of the to-be-detected object according to a change of the biometric feature structure distance ratio corresponding to the image relative to biometric feature structure distance ratios in a feature sequence, wherein the biometric feature structure distance ratios in the feature sequence is calculated according to previous frames of historical images in a video of the image; and
   determining the to-be-detected object as a living body when the action behavior of the to- be-detected object is captured.

6. The method according to claim 5, wherein the capturing the action behavior of the to-be-detected object further comprises:
   calculating an average value of the biometric feature structure distance ratios in the feature sequence;
   calculating a relative change rate of the biometric feature structure distance ratio corresponding to the image based on the average value and the biometric feature structure distance ratio corresponding to the image; and capturing the action behavior of the to-be-detected object when the relative change rate of the biometric feature structure distance ratio corresponding to the image is less than a change threshold.

7. The method according to claim 5, further comprising:

comparing the biometric feature structure distance ratio corresponding to the image with a normal structure interval; and adding the biometric feature structure distance ratio corresponding to the image to the feature sequence when the biometric feature structure distance ratio corresponding to the image is within the normal structure interval.

8. The method according to claim 7, wherein:

the feature sequence is a queue of a specified length; and the adding the biometric feature structure distance ratio corresponding to the image to the feature sequence further comprises controlling the queue to perform:

an enqueue operation for the biometric feature structure distance ratio corresponding to the image when the queue is not full; and a dequeue operation at a queue head and perform an enqueue operation for the biometric feature structure distance ratio corresponding to the image at a queue tail when the queue is full.

9. The method according to claim 5, wherein the biometric feature of the to-be-detected object includes at least one of an eye and a mouth, and the biometric feature structure distance ratio includes at least one of an eye aspect ratio and a mouth aspect ratio.

10. An electronic device including a processor and a memory connected to the processor, the memory storing non-transitory computer-readable instructions that, when executed by the processor, cause the processor to perform the method according to claim 1.

11. A non-transitory computer-readable storage medium that stores a computer program, the computer program, when executed by a processor, causes the processor to perform the method according to claim 1.

12. A living body detection apparatus, comprising:

processing circuitry configured to:

obtain an image of a to-be-detected object;

perform key point detection on a biometric feature corresponding to the to-be-detected object in the image;

construct a constraint box based on detected key points of the biometric feature;

obtain a shape proportion value of the constraint box through calculation based on side lengths of a shape of the constraint box;

compare the shape proportion value and a dynamic change range;

capture a shape change of the constraint box based on the comparison of the shape proportion value of the side lengths of the constraint box and the dynamic change range; and determine the to-be-detected object as a prosthesis when an abnormal deformation of the constraint box is detected in the captured shape change of the constraint box or no key points of the constraint box are detected, wherein the abnormal deformation of the constraint box is detected in the captured shape change of the constraint box based on the shape proportion value falling outside the dynamic change range of the constraint box that is associated with a type of the biometric feature and indicates whether the to-be-detected object is the prosthesis.

13. A payment system, comprising a payment terminal and a payment server, the payment terminal being configured to acquire an image of a payment user;

the payment terminal including the living body detection apparatus as recited in claim 12, wherein the to-be-detected object is the payment user and the living body detection apparatus further determines the payment user as a living body when the abnormal deformation of the constraint box is not detected in the captured shape change of the constraint box; and the payment terminal performing identity authentication on the payment user when the payment user is the living body to initiate a payment request to the payment server when the payment user passes the identity authentication.

14. A video surveillance system, comprising a surveillance screen, cameras, and a surveillance server, the cameras being configured to acquire an image of a monitored object;

the surveillance server including the living body detection apparatus as recited in claim 12, wherein the to-be-detected object is the monitored object and the living body detection apparatus further determines the monitored object as a living body when the abnormal deformation of the constraint box is not detected in the captured shape change of the constraint box; and the surveillance server being configured to perform identity recognition on the monitored object when the monitored object is the living body, to obtain a tracked target, and perform video surveillance on the tracked target by using an image picture in the surveillance screen.

15. The living body detection apparatus according to claim 12, wherein the processing circuitry is configured to:

control a first counter to accumulate when the abnormal deformation of the constraint box is detected in the captured shape change of the constraint box or no key points of the constraint box is detected;

perform living body detection on the to-be-detected object based on latter frames of images in a video of the image; and determine the to-be-detected object as the prosthesis when a count value of the first counter exceeds a first accumulation threshold.

16. The living body detection apparatus according to claim 15, wherein the processing circuitry is configured to:

construct new constraint boxes based on the latter frames of images in the video of the image, wherein each of the new constraint boxes corresponds to a latter frame of image;

track the constraint box constructed based on the new constraint boxes;

monitor, through the tracking, changes of the new constraint boxes relative to the constraint box in the video of the image; and control the first counter to accumulate when an abnormal relative change is detected or a construction failure of any of the new constraint boxes occurs.

17. The living body detection apparatus according to claim 12, wherein:

the biometric feature of the to-be-detected object is a facial feature, and the processing circuitry is configured to:
- perform grayscale processing on the image to obtain a grayscale image of the image; and
- input the grayscale image of the image to a facial key point model for facial feature recognition to obtain the key points of the facial feature of the to-be-detected object in the image.

18. An access system, comprising a reception device, a recognition server, and an access control device,
- the reception device being configured to acquire an image of an access object;
- the recognition server including a living body detection apparatus that is configured to construct a constraint box of the access object according to detected key points of a biometric feature, obtain a shape proportion value of the constraint box through calculation based on side lengths of a shape of the constraint box, compare the shape proportion value and a dynamic change range, capture a shape change of the constraint box based on the comparison of the shape proportion value of the side lengths of the constraint box and the dynamic change range, and determine the access object as a living body when an abnormal deformation of the constraint box is not detected in the captured shape change of the constraint box; and
- the recognition server being configured to perform identity recognition on the access object when the access object is the living body, so that the access control device configures an access permission for the access object that completes the identity recognition successfully, and the access object controls, according to the configured access permission, an access barrier of a specified work region to perform a release action,
- wherein the abnormal deformation of the constraint box is detected in the captured shape change of the constraint box based on the shape proportion value falling outside the dynamic change range of the constraint box that is associated with a type of the biometric feature and indicates whether a to-be-detected object is a prosthesis.

* * * * *